United States Patent [19]
Suzuki

[11] Patent Number: 5,142,964
[45] Date of Patent: Sep. 1, 1992

[54] NEGATIVE PRESSURE BOOSTER

[75] Inventor: Haruo Suzuki, Higashimatsuyama, Japan

[73] Assignee: Jidosha Kiki Co., Ltd., Tokyo, Japan

[21] Appl. No.: 677,051

[22] Filed: Mar. 29, 1991

[30] Foreign Application Priority Data

Apr. 5, 1990 [JP] Japan .................. 2-90669
Apr. 5, 1990 [JP] Japan .................. 2-90670

[51] Int. Cl.$^5$ .............................................. F15B 9/10
[52] U.S. Cl. ...................................... 91/369.1; 91/533; 92/49; 92/99; 277/164
[58] Field of Search .......................... 91/369.1-369.3, 91/376 R, 222, 422, 533; 277/3, 70, 71, 164, 181, 186, 227; 92/99, 105

[56] References Cited

U.S. PATENT DOCUMENTS

| | | | |
|---|---|---|---|
| 2,672,015 | 3/1954 | Adams | 92/48 |
| 3,420,145 | 1/1969 | Stumpe | 92/48 |
| 4,345,506 | 8/1982 | Ohome | 92/99 |
| 4,360,208 | 11/1982 | Hill et al. | 277/186 |
| 4,587,884 | 5/1986 | Tsubouche | 92/48 |
| 4,729,289 | 3/1988 | Boehm | 91/376 R |
| 5,040,450 | 8/1991 | Jakobe | 92/48 |

Primary Examiner—Edward K. Look
Assistant Examiner—F. Daniel Lopez
Attorney, Agent, or Firm—Varndell Legal Group

[57] ABSTRACT

A negative brake booster having a power piston 8 with a piston unit 8a extending in a radial direction, a cylinder unit 8b provided at a backward position in an axial direction and airtightly and slidably supported on a center plate 4. A front diaphragm 12 is provided between the outer peripheral edge of the piston unit 8a and the front shell 2. A rear power piston with a piston unit 9a extending in a radial direction and a cylinder unit 9b furnished at a backward position in an axial direction, and a rear diaphragm 12 are provided between the outer peripheral edge of the piston unit 9a and the front shell. Further, the rear power piston 9 is connected with the valve body 7 where the flange unit 8c of the front power piston 8 is squeezed between the stepped portion of the outer periphery of the valve body 7 by the rear power piston 9.

5 Claims, 4 Drawing Sheets

NEGATIVE PRESSURE BOOSTER

BACKGROUND OF THE INVENTION

The present invention relates to a negative pressure booster to be used as a brake booster, and in particular to a tandem type negative pressure booster, in which two power pistons are arranged in tandem.

In the past, a tandem type brake booster having two power pistons arranged in tandem has been known and disclosed, for example, in the Japanese Provisional Patent Publication No. 55-152656 and the Japanese Provisional Utility Model Publication No. 60-62363, with the purpose of providing higher braking force with lower treading force on brake pedal in a brake booster utilizing negative pressure.

In such a tandem type brake booster, when the brake pedal is pressed for braking, the control valve is switched over. A negative pressure is applied by two power pistons to the two constant pressure chambers and two variable pressure chambers when not in operation. When control valve is switched over, air at atmospheric pressure is introduced into the two variable pressure chambers. By the action of the atmospheric air thus introduced, the two power pistons are operated. By the action of these power pistons, the master cylinder is operated, brake fluid pressure is generated, and braking is performed. In this case, the piston of master cylinder is operated by two power pistons, and maximal braking fluid pressure generated is higher when compared to a the brake booster, which is operated by a single power piston.

Incidentally, electronically controlled components and devices are being increasingly used in recent years for reducing engine room, and there are strong demands for a brake booster, which is shorter in length and compact in design and provides higher output.

In the conventional tandem type brake booster, a valve body or cylinder member mounted on valve body is airtightly and slidably supported on a center plate, which separates the space in the shell into a front chamber and a rear chamber. On the valve body or cylinder member, an inner bead unit having thick front and rear diaphragms is mounted. This leads to a longer axial length of the subassembly where these two inner bead units are mounted on a valve body or cylinder member. Particularly, it is necessary to maintain a predetermined stroke of valve body or cylinder member when inner bead unit is mounted, and it is not possible to shorten its length. As the result, the axial length of brake booster becomes unavoidably long, and its above demand to shorten the overall length cannot be fulfilled.

Also, when inner bead unit is mounted on valve body or cylinder member, a special component and parts such as a fastening member are used. This results in a complicated mounting procedure and its assembly can not be done very efficiently.

Further, in a tandem type negative booster, the two constant pressure chambers permanently communicate with each other through a vacuum passage, and the two variable pressure chambers communicate with each other permanently through an air passage. For example, in the negative booster as disclosed in the above publications, one of these air passage and vacuum passage is furnished on valve body, and the other passage is provided on inner side of the shell.

However, if one of the passages is provided on inner side of the shell, the effective diameter of power piston must be reduced to give space for the passage, and this leads to the reduction of an effective pressure receiving area. The reduction of the effective pressure receiving area increases output loss on the negative pressure booster.

SUMMARY OF THE INVENTION

It is an object of the present invention to provide a negative pressure booster, by which it is possible to shorten the overall length of the booster and to increase its assembling efficiency.

Another object of the invention is to provide a negative pressure booster, in which the effective pressure receiving area of power piston is not reduced, even when vacuum passage and air passage are provided, and output loss is low.

To attain the above objects, the negative pressure booster according to the present invention is characterized in that the front power piston comprises a piston unit is in radial direction, a cylinder unit furnished at a backward position in axial direction continuously to said piston unit and airtightly and slidably supported on said center plate, and a flange unit is furnished at inner position in radial direction continuously to said cylinder unit, a front diaphragm is provided between outer edge of the piston unit and the front shell, a rear power piston comprises a piston unit in radial direction and a cylinder unit furnished at a backward position in radial direction continuously to said piston unit, a rear diaphragm is provided between an outer edge of the piston unit and the front shell, and a rear power piston is connected to the valve body under the condition that the flange unit of the front power piston is squeezed with the stepped portion formed on an outer periphery of the valve body by the rear power piston.

Also, the present invention is characterized in that the rear power piston is connected in such manner that the claw on the cylinder unit is engaged with the groove on the valve body.

Further, the present invention is characterized in that a vacuum passage for communicating the first constant pressure chamber with the second constant pressure chamber and an air passage for communicating the first variable pressure chamber with the second variable pressure chamber are formed on a part of outer periphery of valve body.

In addition, the present invention is characterized in that the vacuum passage and the air passage are formed by a cylinder unit engaged with a part of outer periphery of said valve body and with a groove on a part of outer periphery of the valve body, and that a sealing member is furnished for hermetically sealing the first constant pressure chamber and the second constant pressure chamber and the vacuum passage with the first variable pressure chamber, second variable pressure chamber and the air passage.

Further, the present invention is characterized in that the sealing member is formed by core material, which is covered by sealing material such as rubber.

Further, the present invention is characterized in that a part of sealing member is provided in the air passage and that the other part of the sealing member is squeezed between the stepped portion on the valve body and the rear power piston together with the front power piston.

In a negative pressure booster according to the present invention with such arrangement, the overall length of the negative pressure booster is shortened, because the inner bead unit of diaphragm is not assembled on valve body.

Also, the front power piston and the rear power piston can be easily assembled on the valve body by simply connecting the rear power piston with the valve body, and this leads to more efficient assembly of the booster.

Because the vacuum passage and the air passage are furnished on a part of outer periphery of valve body, no passage is provided on the shell. As the result, it is possible to increase the effective diameter on the outer periphery of the power piston, and the effective pressure receiving area of the power piston is increased. Therefore, the output of the negative pressure booster is increased.

Further, air leakage from the air passage to the vacuum passage and the two constant pressure chambers is prevented by the sealing member, and output loss due to air leakage can be avoided. Accordingly, the output of negative pressure booster can be increased further.

In addition, because the sealing member is squeezed between the stepped portion of valve body and rear power piston, the sealing member can be easily assembled by simpling connecting the rear power piston to the valve body.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

In the following, description is given on the embodiments of this invention in connection with the drawings.

Figure 1:
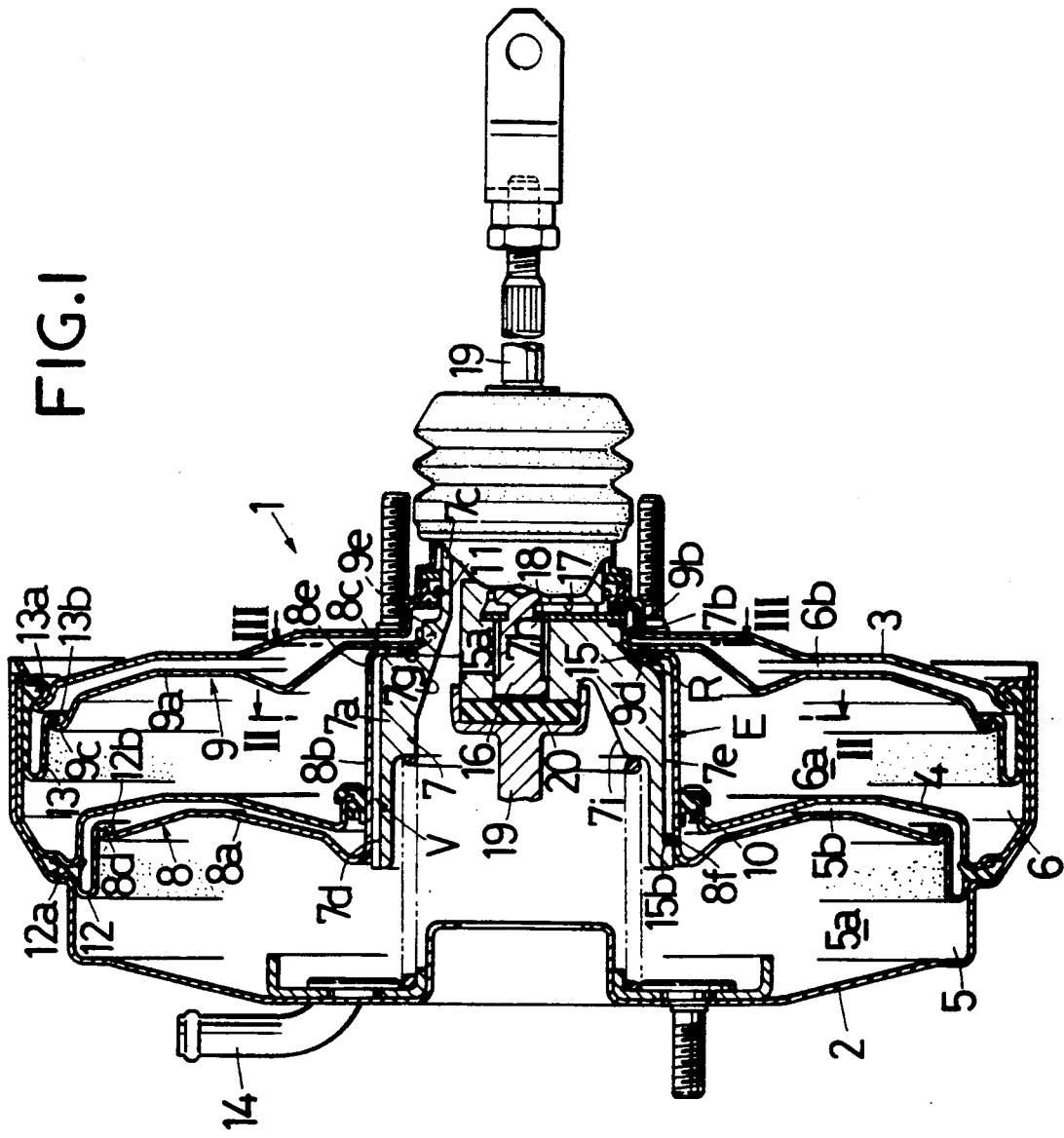
FIG. 1 is a longitudinal sectional view of an embodiment, in which the tandem type negative pressure booster according to the present invention is applied to a brake booster.
Figure 2:
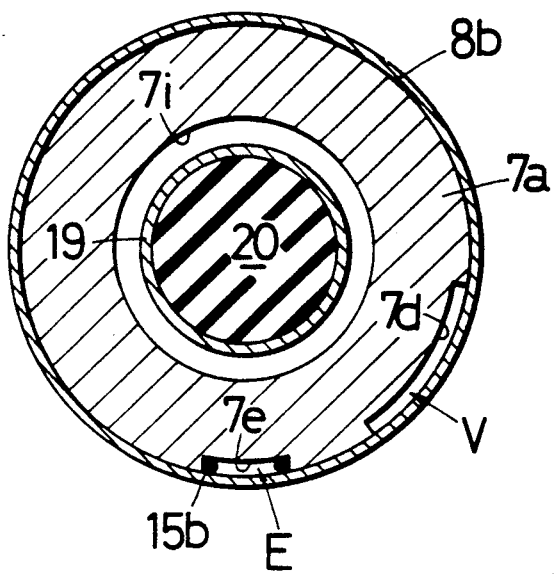
FIG. 2 is a cross-sectional view along the line II—II in FIG. 1.

As shown in FIG. 1 and FIG. 2, brake booster 1 comprises a front shell 2 and a rear shell 3. The front shell 2 and the rear shell 3 are connected with each other by a bayonet joint, for example, with a large space formed inside. The space inside the shells 2 and 3 is divided into a front chamber 5 and a rear chamber 6 by a center plate 4.

A valve body 7 is provided, which penetrates the rear shell 3 and the center Plate 4. This valve body 7 consists of a large diameter unit $7a$, a medium diameter unit $7b$ and a small diameter unit $7c$. On the outer periphery of large diameter unit $7a$, a groove $7d$ extending in the axial direction from the front end to the back end of the large diameter unit $7a$ is furnished, and a groove $7e$ is formed at the position separated by a predetermined angle from the groove $7d$. This groove $7e$ is formed in such a manner that the rear end corner of the large diameter unit $7a$ is provided on a relatively big R portion and that it extends from this R portion to near the front end of the large diameter unit $7a$. As it is evident from FIG. 3, a pair of grooves $7f$ are formed on outer periphery of the medium diameter unit $7b$.

On the front chamber 5 and the rear chamber 6, a front power piston 8 and rear power piston 9 are provided respectively. The front power piston 8 comprises a piston unit $8a$ extending in radial direction, a cylinder unit $8b$ extending backward from this piston unit $8a$, and a flange unit $8c$ extending inwardly in radial direction from the rear end of this cylinder unit $8b$. On the other hand, the rear power piston 9 comprises a piston unit $9a$ and a cylinder unit $9b$ extending backward from this piston unit $9a$.

The cylinder unit $8b$ of the front power piston 8 is airtightly and slidably supported by a sealing member 10. The large diameter unit $7a$ of valve body 7 is engaged with this cylinder unit $8b$, and the small diameter unit $7c$ of valve body 7 is airtightly and slidably supported on the rear shell 3 by a sealing member 11. On the medium diameter unit $7b$ of valve body 7, the cylinder unit $9b$ of rear power piston 9 is engaged.

Between the outer periphery of front the power piston 8 and the front shell 2, and between the outer periphery of rear power piston 9 and the front shell 2, a front diaphragm 12 and a rear diaphragm 13 are provided. In this case, the outer bead unit $12a$ of front diaphragm 12 is squeezed by front shell 2 and center plate 4, and the outer bead unit $13a$ of rear diaphragm 13 is squeezed by rear shell 3 and center plate 4.

Also, the inner bead units $12b$ and $13b$ of the front and rear diaphragms 12 and 13 are fixed on the outer curled portions $8d$ and $9c$ of front and rear power pistons 8 and 9. As the result, the front chamber 5 is divided into a first constant pressure chamber $5a$ and a first variable pressure chamber $5b$, and the rear chamber 6 is divided into a second constant pressure chamber $6a$ and a second variable pressure chamber $6b$.

On the cylinder unit $8b$ of the front power piston 8, a hole $8e$ is provided for communicating the groove $7d$ of the valve body 7 with the second constant pressure chamber $6a$. By the groove $7d$ and the hole $8e$, the first constant pressure chamber $5a$ is communicated with the second constant pressure chamber $6a$ at all times. The first constant pressure chamber $5a$ is communicated with the intake manifold of an engine (not shown) through a negative pressure feeding pipe 14 mounted on the front shell 2. Therefore, negative pressure is always introduced to the first and second constant pressure chambers $5a$ and $6a$, and the groove $7d$ and the hole $8e$ constitute a vacuum passage V.

On the cylinder unit $8b$ of the front power piston 8, the hole $8f$ is provided for communicating the groove $7e$ of valve body 7 with the first variable pressure chamber $5b$. On the rear power piston 9, a hole $9d$ is provided for communicating the groove $7e$ with the second variable pressure chamber $6b$. By the groove $7e$ and the holes $8f$ and $9d$, the first variable pressure chamber $5b$ and second variable pressure chamber $6b$ are communicated with each other at all times. Accordingly, when atmospheric air is introduced into the second variable pressure chamber 6b by the action of a control valve (not shown), atmospheric air is also introduced into first variable pressure chamber 5b, and the groove 7e and the hole 8f constitute an air passage E.

In this way, by forming the air passage E and the vacuum passage V on the outer periphery of the valve body 7, the diameter of the valve body can be reduced compared with the case where these passages are provided within the valve body 7. As the result, the effective pressure receiving area can be enlarged, and the output of the brake booster can be increased.

Figure 4:
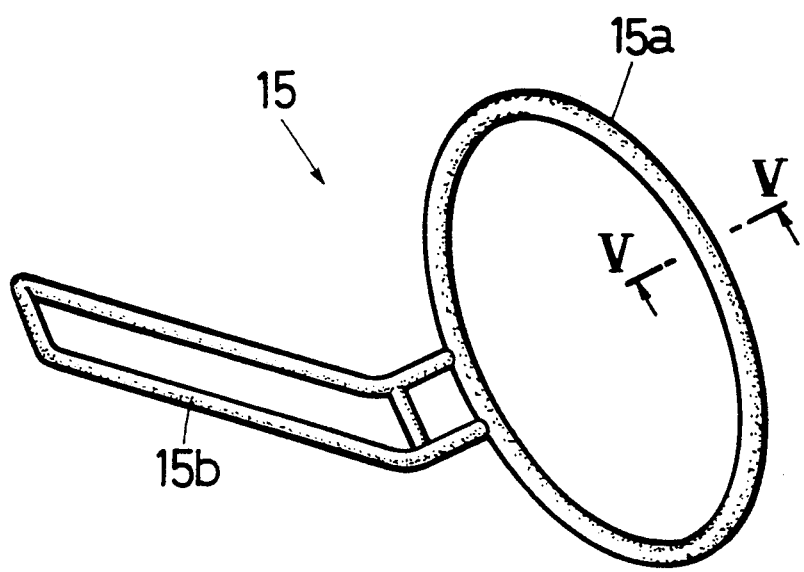
FIG. 4 is a perspective view of the sealing member.
Figure 5:
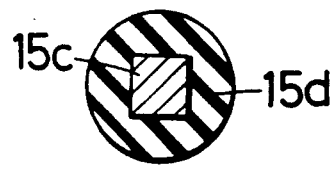
FIG. 5 is a cross-sectional view along the line V—V in FIG. 4.

Because the grooves 7d and 7e of the air passage E and vacuum passage V are provided on the outer periphery of the valve body 7, it is necessary to prevent air in the groove 7e from flowing toward the negative pressure side. For this reason, a sealing member 15 is furnished in this embodiment between the front and rear power pistons 8 and 9 and the valve body 7. As shown in FIG. 4, this sealing member 15 consists of a first sealing unit 15a in having an annular shape mounted on the stepped portion between the large diameter unit 7a and the medium diameter unit 7b of the valve body 7, and of a second sealing unit 15b integrally furnished with this first sealing unit 15a and mounted along the groove 7e. The first sealing unit 15a seals between the second variable pressure chamber 6b and first constant pressure chamber 5a and the second constant pressure chamber 6a. The second sealing unit 15b seals between the groove 7a and the first constant pressure chamber 5a, the second constant pressure chamber 6a and the groove 7d. As shown in FIG. 5, this sealing member 15 is formed by a core material 15c having a rectangular cross-section, which is covered with sealing material 15d such as rubber. By forming the sealing member 15 in this way, the sealing member 15 is maintained in the desired shape.

Figure 3:
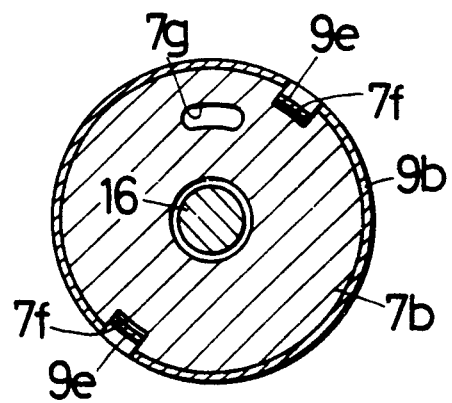
FIG. 3 is a cross-sectional view along the line III—III in FIG. 1.

As shown in FIG. 1 and FIG. 2, the first sealing unit 15a is provided on the stepped portion between the large diameter unit 7a and the medium diameter unit 7b of the valve body 7. After arranging the second sealing unit 15b along the groove 7e, the cylinder unit 8b of the front power piston 8 is engaged in the large diameter unit 7a, and the cylinder unit 9b of the rear power piston 9 is engaged in the medium diameter unit 7b. Next, as shown in FIG. 1 and FIG. 3, a pair of claws 9e formed on the cylinder unit 9b are bent to engage with the grooves 7f and 7f under the condition that the cylinder 9b is pushed forward in a radial direction, and the rear power piston 9 is connected to the valve body 7. In so doing, the flange unit 8c of the front power piston 8 and the sealing member 15 are squeezed between the rear power piston 9 and the stepped portion between the large diameter unit 7a and the medium diameter unit 7b and are assembled on the valve body 7 together with the rear power piston 9. As described above, the two power pistons 8 and 9 can be mounted easily by simply engaging with the valve body 7 and by bending the claw 9e and engaging it with the groove 7f, and this leads to higher efficiency of the assembling work. Moreover, the axial length of the brake booster is shortened because the inner bead units 8d and 9c of the diaphragms 8 and 9 are not fixed on the valve body 7.

When the power pistons 8 and 9 are assembled on the valve body 7, the sealing member 15 is squeezed and pushed in the axial direction by the rear power piston 9 and is pushed in radial direction by the cylinder unit 8b, and the sealing function can be perfectly provided. This contributes to the prevention of output loss due to air leakage.

Further, a hole 7g opened to the first constant pressure chamber 5a is provided on the valve body 7. By this hole 7g, the second variable pressure chamber 7b can be selectively communicated with the first constant pressure chamber 5a through the control valve as in the case of conventional negative pressure booster.

In the hole 7h of valve body 7, a valve plunger 16 is slidably engaged. On the right end of this valve plunger 16, an input shaft 19 interlocked with the brake pedal (not shown) is rotatably connected by a caulking connection. A key member 18 penetrating the hole 17 in the radial direction formed on the valve body 7 and protruding into the hole 7h is engaged to with the valve plunger 16 in such manner that it can relatively move by the predetermined distance in the axial direction.

Further, an output shaft 19 is provided in the hole 7i of the valve body 7, and the valve body 7 is slidably engaged in the hole, which is formed on the large diameter unit at the right end of this output shaft 19. In the hole of this large diameter unit at its right end, a reaction disk 20 is accommodated between the valve body 7 and the output shaft 19. Therefore, the left end of the valve plunger 16 is placed face-to-face to the reaction disk 20 with a certain gap.

The other arrangements of this embodiment are not described here because they are basically the same as those of the conventionally known negative pressure boosters, including the negative pressure boosters disclosed in the above publications.

Next, a description is given on the operating principle of this embodiment. Because the operation of this embodiment is almost the same as that of conventional type negative pressure booster, the description is given here only on the different components, and the other components are not described here.

When the control valve is switched over during braking operation, atmospheric air is introduced into the second variable pressure chamber 6b, and the atmospheric air is introduced into the first variable pressure chamber 5b through the air passage E. In this case, the leakage of the air, flowing in the groove 7e of the air passage E, into the first and second constant pressure chambers 5a and 6a is prevented by the sealing member 15, and the output loss due to air leakage occurs almost not at all. Because the valve body 7 is provided with the groove 7d in the vacuum passage V and the groove 7e in the air passage E and these are not furnished on the shell 2, the effective pressure receiving areas of power pistons 8 and 9 and the diaphragms 12 and 13 are enlarged, and this contributes to the increased output of the brake booster.

Figure 6:
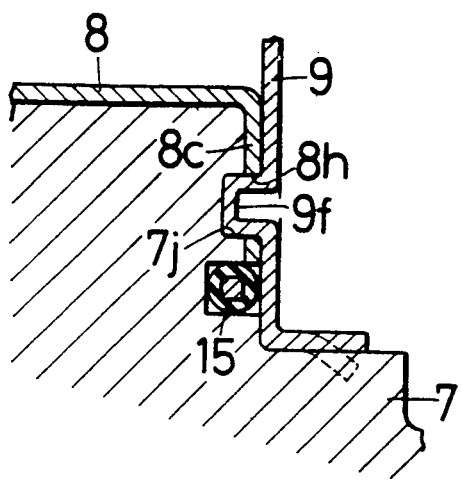
FIG. 6 shows another embodiment of this invention and is a cross-sectional view along the line VI—VI in FIG. 7.
Figure 7:
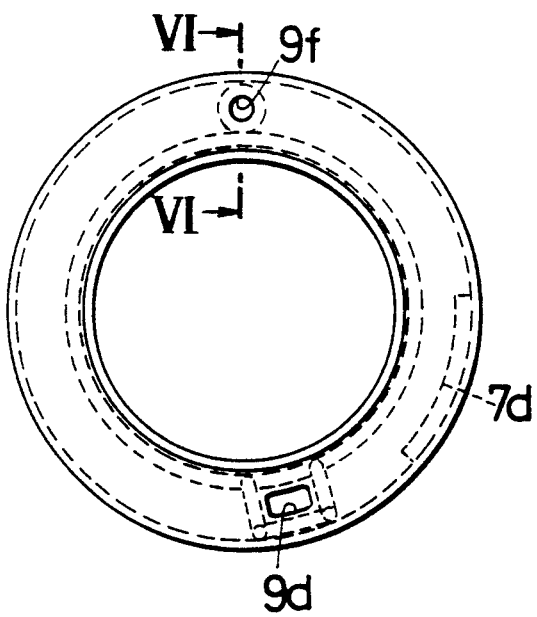
FIG. 7 represents another embodiment of this invention and is a view, in which the rear power piston of FIG. 1 is seen from the right.

FIG. 6 and FIG. 7 show another embodiment of this invention. Because the same components as in the above embodiment are referred by the same symbols, a detailed description is not given here.

As shown in FIG. 6 and FIG. 7, a hole 8h is provided on the flange unit 8c of the front power piston 8 in this embodiment, and a hole 7j having almost the same diameter as the hole 8h is provided on the stepped portion of the valve body 7 corresponding to the hole 8h. On the other hand, a projection 9f penetrating the hole 8h and engaging with the hole 7j is formed on the rear power piston 9. When the front and rear power pistons 8 and 9 are assembled on the valve body 7, this projection 9f penetrates the hole 8h and is engaged with the hole 7j. This ensures the positioning of front and rear power pistons 8 and 9 in the rotating direction relative to the valve body 7. (The rear power piston 9 is also positioned in the rotating direction by the groove 7f and the claw 9e.) In so doing, it is possible to perfectly align the groove 7e of the air passage E with the hole 8f of the front power piston 8 and also to align the groove 7d of the vacuum passage V with the hole 8e of the front power piston 8.

Because the positioning of rear power piston 9 and valve body 7 in the rotating direction is performed by the groove 7f and the claw 9e, it is possible to ensure perfect positioning in the rotating direction by providing the front power piston 8 with an engagement unit, which is engaged with the valve body 7 and/or rear power piston 9.

In the above embodiment, fixing means by the engagement of the claw 9e and the groove 7f is used as the means for fixing the rear diaphragm 9 on the valve body 7, whereas it is possible according to the present invention to use other fixing means such as a bayonet connection. Also, one or three or more claws 9e may be furnished.

In the above embodiment, a description has been given only on the case where the negative pressure booster of this invention is applied to brake booster, while the present invention can also be applied to the other boosters such as clutch booster.

As it is evident from the above description, it is possible according to the negative pressure booster of this invention to shorten the overall length of the negative pressure booster because the inner bead unit of diaphragm is not assembled on valve body.

Because both the front and rear power pistons can be easily assembled on the valve body by simply connecting the rear power piston on valve body, the working efficiency for assembling can be improved.

Further, because neither the vacuum passage nor the air passage is provided on the shell, the effective pressure receiving area of the power pistons can be enlarged. Accordingly, the negative pressure booster of this invention can provide a high output.

In addition, air leakage from the air passage to the vacuum passage and the two constant pressure chamber can be prevented by the sealing member, and this leads to the increased output of the negative pressure booster.

Further, because the sealing member is placed between the stepped portion of the valve body and the rear power piston, the sealing member can be easily assembled by simply connecting the rear power piston to the valve body. This facilitates the assembling of the sealing member.

What we claim is:

1. A negative pressure booster of tandem type which comprises:
    a center plate dividing a chamber formed by a front shell and a rear shell into a front chamber and a rear chamber;
    a valve body movably provided in said rear shell and said center plate for forward and backward movement and having a smaller diameter cylindrical unit penetrating the rear shell and a larger diameter cylindrical unit penetrating the center plate, and a graded step between said small diameter cylindrical unit and said larger diameter cylindrical unit;
    a front power piston connected to said valve body and positioned in said front chamber, said front power piston including a cylinder unit surrounding said valve body;
    a rear power piston connected to said valve body and positioned in said rear chamber;
    a front diaphragm provided on a backside of said front power piston and dividing said front chamber into a first constant pressure chamber and a first variable pressure chamber;
    a rear diaphragm provided on a backside of said rear power piston and dividing said rear chamber into a second constant pressure chamber and a second variable pressure chamber;
    a control valve provided in said valve body and introducing atmospheric air into said first variable pressure chamber and said second variable pressure chamber during operation;
    first grooves formed on a part of an outer periphery of said larger diameter cylinder unit of said valve body, said first grooves together with an inner periphery of said cylinder unit forming a vacuum passage communicating said first constant pressure chamber with said second constant pressure chamber;
    second grooves formed on another part of said outer periphery of said larger diameter cylindrical unit of said valve body, said second grooves together with said inner periphery of said cylinder unit forming an air passage communicating said first variable pressure chamber with said second variable pressure chamber; and
    a sealing member having a first part provided in said air passage for hermetically sealing between said vacuum passage and said air passage, and a second part squeezed by said graded step of said valve body and said rear power piston to hermetically seal between said second constant pressure chamber and said air passage.

2. A negative pressure booster of tandem type according to claim 1, wherein said first and second parts of said sealing member are integrally formed.

3. A negative pressure booster of tandem type according to claim 1, wherein said sealing member has a core material covered by a sealing material, and a cross-section of said sealing member is circular in shape.

4. A negative pressure booster of tandem type according to claim 3, wherein said sealing material is rubber.

5. A negative pressure booster of tandem type which comprises:
    a center plate dividing a chamber formed by a front shell and a rear shell into a front chamber and a rear chamber;
    a valve body movably provided in said rear shell and said center plate for forward and backward movement and having a smaller diameter cylindrical unit penetrating the rear shell and a larger diameter cylindrical unit penetrating the center plate, and a graded step between said small diameter cylindrical unit and said larger diameter cylindrical unit;
    a front power piston connected to said valve body and positioned in said front chamber, said front power piston including a cylinder unit extending backwards, said cylinder unit slidably penetrating said center plate;
    a rear power piston connected to said valve body and positioned in said rear chamber;
    a front diaphragm provided on a backside of said front power piston and dividing said front chamber into a first constant pressure chamber and a first variable chamber;

a rear diaphragm provided on a backside of said rear power piston and dividing said rear chamber into a second constant pressure chamber and a second variable pressure chamber;

a control valve provided in said valve body and introducing atmospheric air into said first variable pressure chamber and said second variable pressure chamber during operation;

first grooves formed on a part of an outer periphery of said larger diameter cylinder unit of said valve body, said first grooves together with an inner periphery of said cylindrical unit forming a vacuum passage communicating said first constant pressure chamber with said second constant pressure chamber;

second grooves formed on another part of said outer periphery of said larger diameter cylindrical unit of said valve body, said second grooves together with said inner periphery of said cylinder unit forming an air passage communicating said first variable pressure chamber with said second variable pressure chamber; and a sealing member having a first part provided in said air passage and a second part squeezed by said graded step of said valve body and said rear power piston.

* * * * *